(12) United States Patent
Klasing et al.

(10) Patent No.: US 8,632,311 B2
(45) Date of Patent: Jan. 21, 2014

(54) FLARED TIP TURBINE BLADE

(75) Inventors: Kevin Samuel Klasing, Springboro, OH (US); Ching-Pang Lee, Cincinnati, OH (US); Paul Hadley Vitt, Hamilton, OH (US); Brian David Keith, Cincinnati, OH (US)

(73) Assignee: General Electric Company, Schenectady, NY (US)

( * ) Notice: Subject to any disclaimer, the term of this patent is extended or adjusted under 35 U.S.C. 154(b) by 2333 days.

(21) Appl. No.: 11/507,119

(22) Filed: Aug. 21, 2006

(65) Prior Publication Data

US 2010/0221122 A1 Sep. 2, 2010

(51) Int. Cl.
*F01D 5/14* (2006.01)

(52) U.S. Cl.
USPC ............... 416/228; 415/173.4; 415/174.4

(58) Field of Classification Search
USPC ............ 415/173.1, 173.4, 174.4; 416/228
See application file for complete search history.

(56) References Cited

U.S. PATENT DOCUMENTS

| | | | |
|---|---|---|---|
| 3,012,709 A | 12/1961 | Schnell | |
| 3,635,585 A | 1/1972 | Metzler | |
| 3,781,129 A | 12/1973 | Aspinwall | |
| 4,010,531 A | 3/1977 | Andersen et al. | |
| 4,142,824 A | 3/1979 | Anderson | |
| 4,390,320 A | 6/1983 | Eiswerth | |
| 4,424,001 A | 1/1984 | North et al. | |
| 4,606,701 A | 8/1986 | McClay et al. | |
| 4,893,987 A | 1/1990 | Lee et al. | |
| 4,940,388 A | 7/1990 | Lilleker et al. | |
| 4,992,025 A | 2/1991 | Stroud et al. | |
| 5,261,789 A | 11/1993 | Butts et al. | |
| 5,282,721 A | 2/1994 | Kildea | |
| 5,476,364 A | 12/1995 | Kildea | |
| 5,503,527 A | 4/1996 | Lee et al. | |
| 5,564,902 A | 10/1996 | Tomita | |
| 5,660,523 A | 8/1997 | Lee | |
| 5,720,431 A | 2/1998 | Sellers et al. | |
| 6,039,531 A | 3/2000 | Suenaga et al. | |
| 6,059,530 A | 5/2000 | Lee | |
| 6,086,328 A | 7/2000 | Lee | |
| 6,164,914 A | 12/2000 | Correia et al. | |
| 6,224,336 B1 | 5/2001 | Kercher | |

(Continued)

FOREIGN PATENT DOCUMENTS

| | | |
|---|---|---|
| DE | 1428165 | 2/1969 |
| JP | 53077319 | 7/1978 |
| JP | 2004124813 | 4/2004 |
| WO | 2005106207 | 11/2005 |

OTHER PUBLICATIONS

Mischo, B., "Flow Physics and Profiling of Recessed Blade Tips: Impact on Performance and Heat Load," ASME GT2006-91074, May 8-11, 2006, pp. 1-11.
U.S. Appl. No. 11/162,433, "Turbine Airfoil with Curved Squealer Tip," filed Sep. 9, 2005, M.E. Stegemiller et al.
U.S. Appl. No. 11/162,434, "Turbine Airfoil Curved Squealer Tip with Tip Shelf," filed Sep. 9, 2005, M.E. Stegemiller et al.

(Continued)

*Primary Examiner* — Edward Look
*Assistant Examiner* — Aaron R Eastman
(74) *Attorney, Agent, or Firm* — Matthew Hayden; Trego, Hines & Ladenheim, PLLC

(57) ABSTRACT

A turbine blade includes an airfoil terminating in a tip. The tip includes a first rib conforming with a concave pressure side of the airfoil, and a second rib conforming with a convex suction side of the airfoil. The second rib is flared outwardly from the suction side.

13 Claims, 4 Drawing Sheets

(56) References Cited

U.S. PATENT DOCUMENTS

| | | | |
|---|---|---|---|
| 6,527,514 B2 | 3/2003 | Rueloffs | |
| 6,554,575 B2 | 4/2003 | Leeke et al. | |
| 6,595,749 B2 | 7/2003 | Lee et al. | |
| 6,672,829 B1 | 1/2004 | Cherry et al. | |
| 6,790,005 B2 | 9/2004 | Lee et al. | |
| 7,029,235 B2 * | 4/2006 | Liang | 416/92 |
| 2003/0170120 A1 | 9/2003 | Grunke et al. | |
| 2005/0244270 A1 | 11/2005 | Liang | |

OTHER PUBLICATIONS

U.S. Appl. No. 11/507,116, filed Aug. 21, 2006, by K.S. Klasing et al.
U.S. Appl. No. 11/507,120, filed Aug. 21, 2006, by K.S. Klasing et al.
U.S. Appl. No. 11/507,121, filed Aug. 21, 2006, by K.S. Klasing et al.
U.S. Appl. No. 11/507,132, filed Aug. 21, 2006, by Ching-Pang Lee et al.
Extended European Search Report dated Jun. 22, 2012 for EP application 07114370.5.

* cited by examiner

FLARED TIP TURBINE BLADE

BACKGROUND OF THE INVENTION

The present invention relates generally to gas turbine engines, and, more specifically, to turbine blades therein.

In a gas turbine engine, air is pressurized in a compressor and mixed with fuel for generating combustion gases in a combustor. Various turbine stages extract energy from the combustion gases to power the engine and produce work.

A high pressure turbine (HPT) immediately follows the combustor and extracts energy from the hottest combustion gases to power the upstream compressor through one drive shaft. A low pressure turbine (LPT) follows the HPT and extracts additional energy from the combustion gases for powering another drive shaft. The LPT powers an upstream fan in a turbofan aircraft engine application, or powers an external shaft for marine and industrial applications.

Engine efficiency and specific fuel consumption (SFC) are paramount design objectives in modern gas turbine engines. The various turbine rotor blades and their corresponding nozzle vanes have precisely configured aerodynamic surfaces for controlling the velocity and pressure distributions thereover for maximizing aerodynamic efficiency.

The corresponding airfoils of the blades and vanes have generally concave pressure sides and generally convex suction sides extending axially in chord between opposite leading and trailing edges. The airfoil has a crescent profile in radial section, increasing rapidly in width from the leading edge to a maximum width region, and then decreasing in width gradually to the trailing edge.

The circumferentially or transversely opposite sides of the airfoils also extend radially in span from root to tip. The airfoils typically have thin sidewalls formed by casting of superalloy metals, with internal cooling circuits having various embodiments all specifically tailored for efficiently cooling the airfoils during operation while maximizing efficiency.

However, aerodynamic design of turbine airfoils is remarkably complex in view of the three dimensional (3D) configurations of the individual airfoils in complete rows thereof, and the correspondingly complex flow streams of the combustion gases channeled between the airfoils during operation. Adding to this complexity of design and environment are the special flow fields around the radially outer tips of the turbine blades which rotate at high speed inside a surrounding stationary shroud during operation.

The operating clearance or gap between the blade tips and the turbine shrouds should be as small as practical for minimizing leakage of the combustion gas flow therethrough while also permitting thermal expansion and contraction of the blades and shrouds without undesirable rubbing between the rotating tips and stationary shroud.

During operation, the blades in a turbine row drive the supporting rotor disk in rotation with the airfoil suction side leading the opposite airfoil pressure side. The airfoils typically twist from root to tip in the radial direction from the perimeter of the rotor disk, and the leading edges face upstream obliquely with the engine axial centerline axis to match the oblique discharge swirl angle of the cooperating nozzle vanes. The combustion gases flow generally in the axial downstream direction, with a circumferential or tangential component first engaging the airfoil leading edges in one flow direction, and then leaving the airfoils over the trailing edges thereof in a different flow direction.

The pressure and suction sides of the airfoils have correspondingly different 3D profiles for maximizing differential pressure therebetween and energy extraction from the hot combustion gases. The concave pressure side and the convex suction side effect different velocity and pressure distributions thereover which correspondingly vary between the leading and trailing edges, and from root to tip. However, the combustion gases which leak over the airfoil tips in the required tip clearance perform little, if any, useful work.

Further complicating turbine blade design is the exposed blade tips which are therefore bathed in the combustion gases which leak thereover during operation, and require suitable cooling thereof for ensuring a long useful life of the turbine blades during operation.

Modern turbine blade design typically incorporates squealer tip ribs which are small radial extensions of the pressure and suction sides of the airfoil from leading to trailing edge. The tip ribs are typically rectangular in cross section and spaced transversely or circumferentially apart to define an open tip cavity atop the airfoil which has an integral tip floor that encloses the typically hollow airfoil and the internal cooling circuit therein.

The small tip ribs provide sacrificial material in the event of a tip rub to protect the tip floor and internal cooling circuit from undesirable damage. The tip ribs increase the complexity of the combustion gas flow field introducing local secondary fields which affect turbine efficiency, flow leakage, and tip cooling.

The primary flow direction of the combustion gases is in the axially downstream direction in the flow passages defined between adjacent blades. The axial flow stream also varies along the radial direction from root to tip of each airfoil. And, these axial and radial flow variations are further compounded over the airfoil tip where the combustion gases leak between the pressure and suction sides of each airfoil.

Accordingly, the prior art is replete with various configurations of turbine blade tips addressing different problems and performance considerations including turbine efficiency, tip leakage, and tip cooling. These three important considerations are interdependent at least in part, but the complex 3D flow fields over the different pressure and suction sides at the airfoil tip and between the leading and trailing edges renders quite complex the evaluation thereof.

However, modern computational fluid dynamics (CFD) includes powerful software that improves the ability to mathematically analyze complex 3D flow streams in gas turbine engines and provides a mechanism from which further improvements in turbine blade design may be realized.

For example, it is desired to improve turbine blade tip design by reducing tip flow leakage, or increasing turbine efficiency, or improving tip cooling, or any combination of these factors either separately or together.

BRIEF DESCRIPTION OF THE INVENTION

A turbine blade includes an airfoil terminating in a tip. The tip includes a first rib conforming with a concave pressure side of the airfoil, and a second rib conforming with a convex suction side of the airfoil. The second rib is flared outwardly from the suction side.

BRIEF DESCRIPTION OF THE DRAWINGS

The invention, in accordance with preferred and exemplary embodiments, together with further objects and advantages thereof, is more particularly described in the following detailed description taken in conjunction with the accompanying drawings in which.

DETAILED DESCRIPTION OF THE INVENTION

Figure 1:
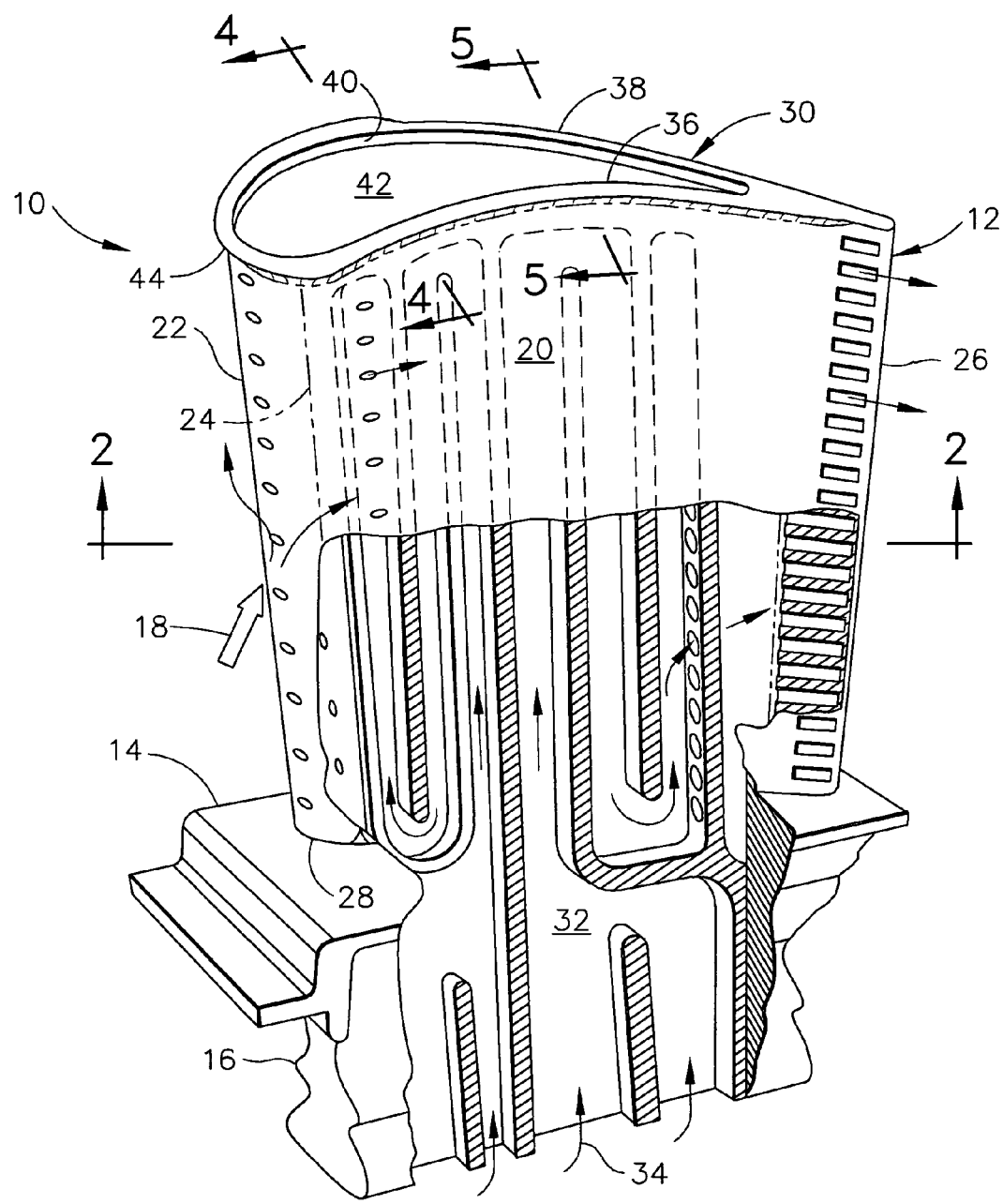
FIG. 1 is a partly sectional, isometric view of an exemplary first stage turbine rotor blade.

FIG. 1 illustrates an exemplary first stage turbine rotor blade 10 for use in the HPT of a gas turbine engine. The blade is typically cast from superalloy metal with an airfoil 12, platform 14 at the root thereof, and a supporting dovetail 16 in an integral, one-piece assembly.

The dovetail 16 may have any conventional form, such as the axial-entry dovetail illustrated in FIG. 1, which mounts the blade in a corresponding dovetail slot in the perimeter of a supporting rotor disk (not shown). The disk holds a full row of the blades spaced circumferentially apart from each other to define inter-blade flow passages therebetween.

During operation, combustion gases 18 are generated in the combustor of the engine (not shown) and suitably channeled downstream over the corresponding turbine blades 10 which extract energy therefrom for powering the supporting rotor disk. The individual platform 14 provides a radially inner boundary for the combustion gases and adjoins adjacent platforms in the full row of turbine blades.

Figure 2:
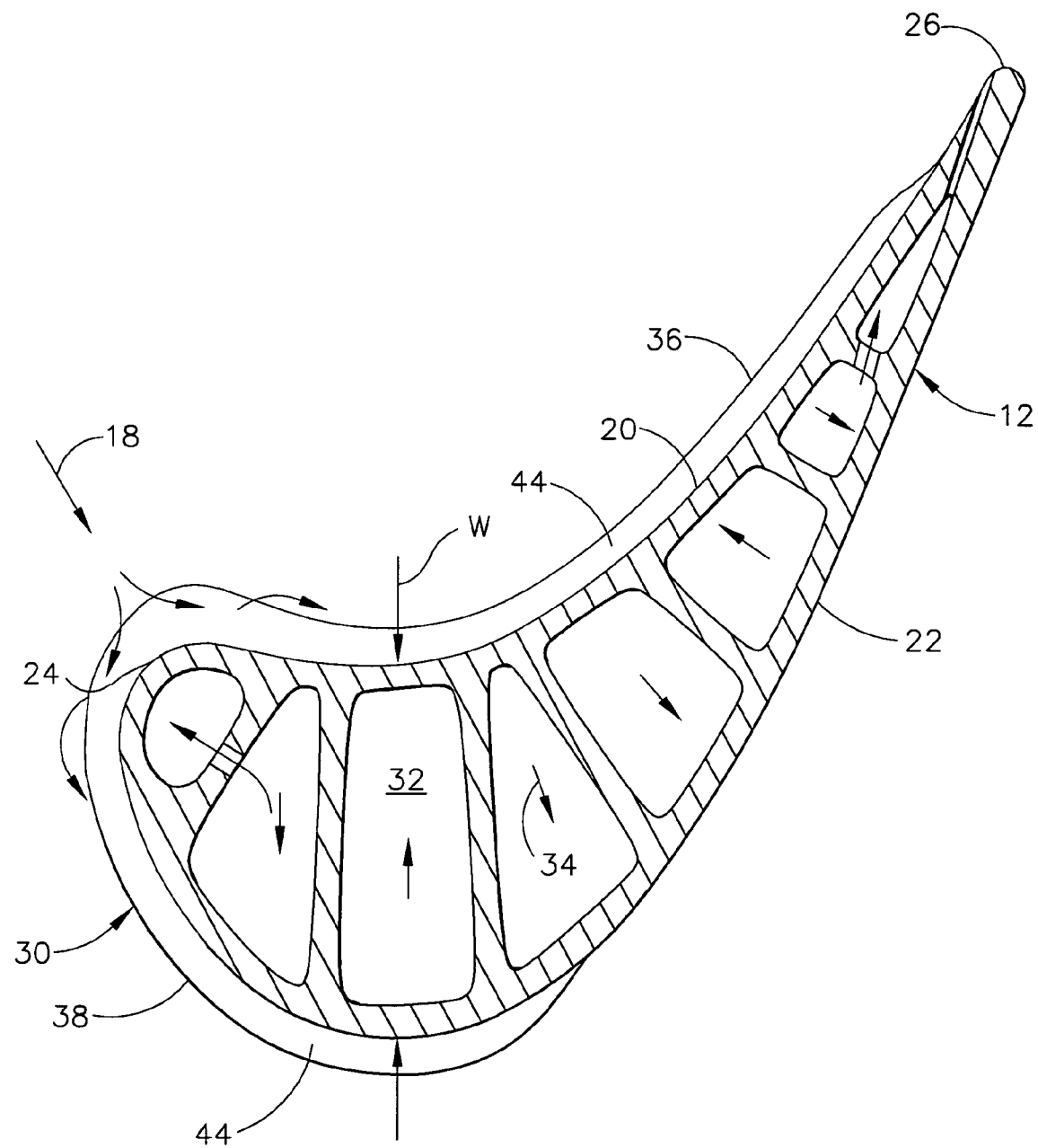
FIG. 2 is a radial sectional view through the blade airfoil illustrated in FIG. 1 and taken along line 2-2.

The airfoil 12 illustrated in FIGS. 1 and 2 includes circumferentially or transversely opposite pressure and suction sides 20,22 extending axially in chord between opposite leading and trailing edges 24,26 and extends radially in span from the airfoil root 28 to terminate in a radially outer tip cap, or tip, 30. The airfoil pressure side 20 is generally concave between the leading and trailing edges and complements the generally convex airfoil suction side 22 between the leading and trailing edges.

The external surfaces of the pressure and suction sides 20,22 of the airfoil have the typical crescent shape or profile conventionally configured for effecting corresponding velocity and pressure distributions of the combustion gases thereover during operation for maximizing energy extraction from the gases.

The airfoil 12 is typically hollow and includes an internal cooling circuit 32 which may have any conventional configuration, such as the illustrated two three-pass serpentine circuits that terminate in corresponding flow passages behind the leading edge and in front of the trailing edge. The cooling circuit extends through the platform and dovetail with corresponding inlets in the base of the dovetail for receiving pressurized cooling air 34 from the compressor of the engine (not shown) in any conventional manner.

In this way, the blade is internally cooled from root to tip and between the leading and trailing edges by the internal cooling air which then may be discharged through the thin airfoil sidewalls in various rows of film cooling holes of conventional size and configuration.

Since the leading edge of the airfoil is typically subject to the hottest incoming combustion gases, dedicated cooling thereof is provided in any suitable manner. And, the thin trailing edge region of the airfoil typically includes a row of pressure side trailing edge cooling slots for discharging a portion of the spent cooling air.

As described above, the turbine airfoil 12 shown initially in FIG. 1 has a precisely configured 3D external profile which correspondingly affects the velocity and pressure distributions of the combustion gases 18 as they flow in the axial downstream direction from leading to trailing edges 24,26. The blades are attached to the perimeter of the supporting disk and rotate during operation, which generates secondary flow fields in the combustion gases with typically radially outwardly migration of the combustion gases along the span of the airfoil.

Furthermore, the relative pressure of the combustion gases on the pressure side 20 of the airfoil is higher than the pressure along the suction side of the airfoil, and along with the corresponding rotation of the blade during operation introduces further secondary or tertiary affects in the combustion gas flow field as it flows radially up and over the exposed airfoil tip 30 during operation.

The turbine rotor blade described above may be conventional in configuration and operation for use in a gas turbine engine, including for example the first stage of the HPT. The conventional blade may then be modified as described hereinbelow at the airfoil tip 30 to include first and second squealer tip ribs 36,38 which are radially integral extensions of the airfoil pressure and suction sides, or sidewalls, 20,22, respectively, and conform in profile or curvature therewith.

The first or pressure side rib 36 conforms chordally with the shape or profile of the concave pressure side 20 of the airfoil, and correspondingly, the second or suction side rib 38 conforms in chordal profile with the convex suction side 22 of the airfoil.

Figure 3:
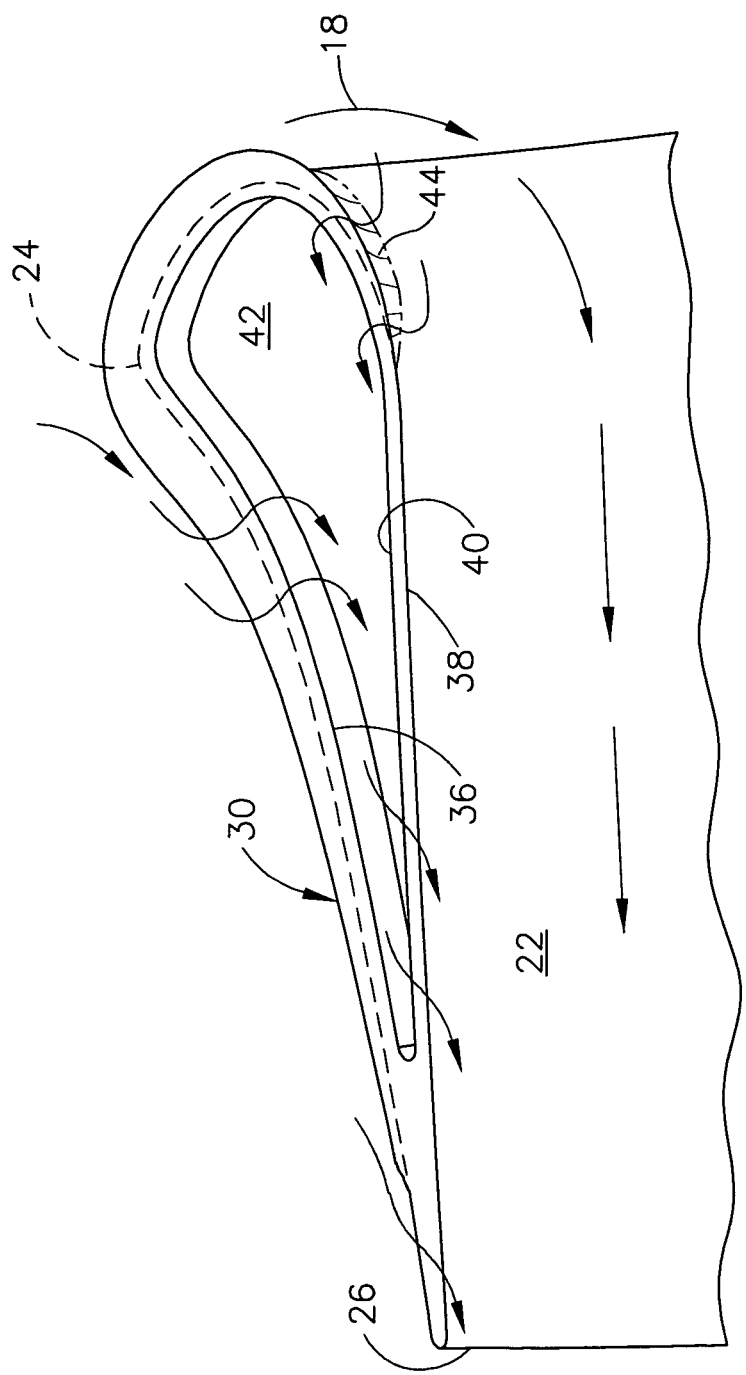
FIG. 3 is an enlarged suction side view of the airfoil tip illustrated in FIG. 1.

As best shown in FIGS. 1 and 3, the two ribs 36,38 are spaced transversely apart between the airfoil leading and trailing edges 24,26 to define an open or exposed tip cavity 40 at the radially outer tip of the airfoil. The two ribs 36,38 are integrally joined together at the airfoil leading edge 24 and at the relatively thin airfoil trailing edge 26 to provide a full perimeter boundary for the tip cavity 40.

The tip cavity includes a tip floor 42 which bridges the opposite pressure and suction sidewalls of the airfoil to enclose the radially outer end of the airfoil and the internal cooling circuit 32. The tip floor 42 is typically solid, but may have small cooling holes or dust holes (not shown) for discharging some of the spent air from the internal cooling circuit in any conventional manner.

As described above, the two ribs 36,38 provide short radial extensions of the corresponding pressure and suction sidewalls of the airfoil and introduce the recessed tip cavity for improving performance and longevity of the turbine blade. The small ribs may accommodate occasional tip rubbing in the turbine and protect the internal cooling circuit 32 therefrom. However, the tip cavity also provides a local region over which the combustion gases flow during operation as they leak over the tip between the pressure and suction sides of the blade.

In order to further improve performance of the turbine blade initially illustrated in FIGS. 1-3, the second, or suction side rib 38 is preferentially flared radially outwardly and laterally from the airfoil suction side external surface to provide a small overhang thereabove. In particular, the second rib 38 may be modified from the typical rectangular configuration thereof to include an external or outboard surface flare 44 in the exemplary form of the typical arcuate fillet. The suction side flare 44 is illustrated in transverse section in FIG. 4 and spreads laterally outwardly from the airfoil suction side 22 in the radially outward direction to the outer surface of the second tip rib 38.

FIG. 2 illustrates an exemplary radial cross section of the airfoil and the typical crescent profile thereof which varies suitably from root to tip of the airfoil as required for extracting energy from the combustion gases. Common to the various radial cross sections is the airfoil increasing rapidly in transverse width W aft from the leading edge 24 to the hump location of maximum width just before the midchord of the airfoil, with the airfoil then decreasing gradually in width to the narrow or thin trailing edge 26. The suction side flare 44 preferably extends chordally aft between the leading edge 24 and the maximum airfoil width at the airfoil tip in a continuous overhang.

On the airfoil suction side, the flare 44 commences at and extends from the airfoil leading edge 24 and extends along the second rib 38 continuously therewith in the downstream direction toward the trailing edge.

The flare 44 continues along the second rib 38 to terminate near the airfoil maximum width at the tip 30 as illustrated in FIGS. 2 and 3. The flare may terminate short of the tip maximum width, or may terminate at that location, or may extend slightly aft thereof in the exemplary embodiment illustrated in FIG. 2. The chordal extent of the flare 44 on the suction side second rib 38 will vary depending upon the specific turbine blade design and combustion gas flow field over the airfoil tip.

Whereas the second rib 38 itself extends continuously from the leading edge 24 to the trailing edge 26 where it joins the first rib 36, the flare 44 blends away or terminates into the airfoil suction side 22 immediately aft of the airfoil maximum width at the tip. For example, the flared second rib 38 may extend aft to about 10%-30% of the chord length of the airfoil between the leading and trailing edges. The remaining 70%-90% of the chord length over the aft end of the suction side may be flareless, with a coplanar continuation of the external surface of the suction side 22 over the full outboard surface of the second rib 38 aft of the terminated flare 44.

FIGS. 1-3 illustrate exemplary streamlines of the combustion gases 18 as they split around the leading edge 24 of the airfoil and travel aft along the opposite sides of the airfoil. The incident gas streamlines along the leading edge of the airfoil near the tip spread laterally and flow radially outwardly over corresponding forward portions of the first and second ribs 36,38.

Figure 4:
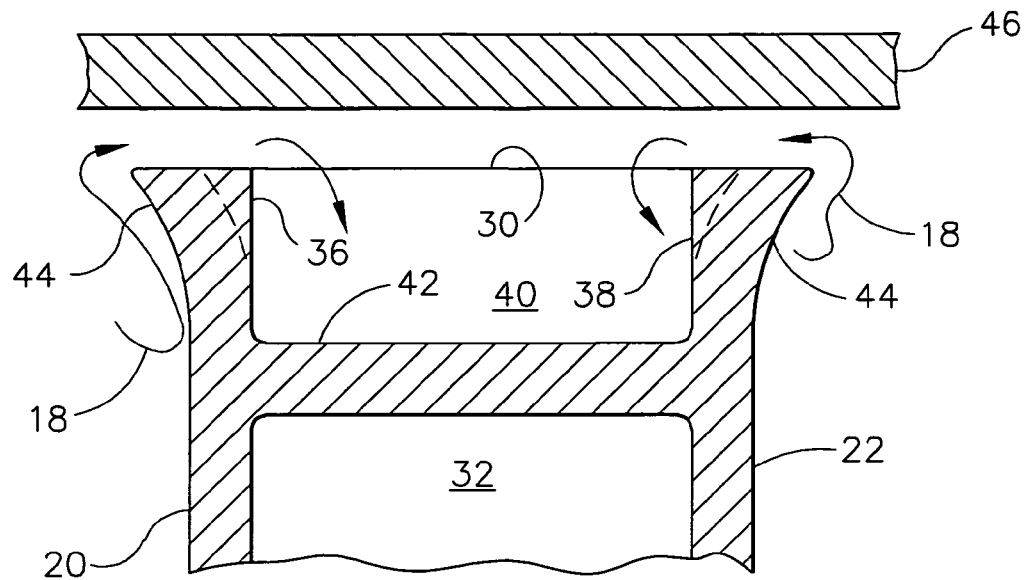
FIG. 4 is transverse radial sectional view through a forward portion of the airfoil tip illustrated in FIG. 1 and taken along line 4-4.

Accordingly, by introducing the flare 44 on the suction side second rib 38 an additional overhang restriction is provided in opposition to the free flow of the local streamlines. FIG. 4 illustrates a transverse section of the airfoil near the maximum width thereof at the tip, which tip is mounted radially inside a surrounding turbine shroud 46, shown in part. The airfoil is sized in radial span to position the tip 30 closely adjacent to the inner surface of the shroud 46 for providing a small clearance or radial gap therebetween through which some of the combustion gases will leak during operation.

The flared second rib 38 along the suction side of the airfoil introduces an effective flow restriction for the combustion gases as they flow radially outwardly over the leading edge region of the airfoil as shown schematically in FIGS. 3 and 4.

To complement performance of the flared second rib around the leading edge 24, the pressure side first rib 36 illustrated in FIGS. 1-4 may correspondingly be flared outwardly from the pressure side 20 around the leading edge 24 and integrally joins with the flared second rib 38 thereat. As shown in FIGS. 2 and 4, the external surface of the first rib 36 includes a corresponding flare 44 for creating a corresponding pressure side overhang around the airfoil leading edge.

FIGS. 3 and 4 illustrate schematically how the flared first and second ribs 36,38 extend continuously around the leading edge of the airfoil at its tip and provide corresponding resistance to the combustion gas flow in the axial downstream direction as it flows over the airfoil tip and through the shroud-airfoil clearance.

The flared first rib 36 as shown in FIGS. 1-3 preferably blends away or terminates into the airfoil pressure side 20 near the trailing edge 26, and is therefore substantially longer in extent than the flared second rib 38 on the opposite suction side which terminates well upstream therefrom.

The width or extent of the overhanging flares 44 may vary as desired over the varying contours of the airfoil suction and pressure sides. For example, the width of the suction side flare 44 may be substantially constant from its end termination with the suction side forward to its commencement around the airfoil leading edge 24.

The width of the flare around the leading edge may then increase to maximum width on the pressure side immediately aft of the leading edge as illustrated in FIG. 2 to avoid the hottest gases at the stagnation point of the incident combustion gases directly at the leading edge. The pressure side flare 44 may then have a substantially constant width aft to its termination near the trailing edge where it blends with the radially straight profile of the pressure side 20.

Due to the differential pressure distribution between the opposite pressure and suction sides 20,22 shown in FIGS. 1-3, the predominant direction of combustion gas flow leakage is over the full extent of the pressure side between the leading and trailing edges, and exiting over the relatively flat aft section of the airfoil suction side.

Figure 5:
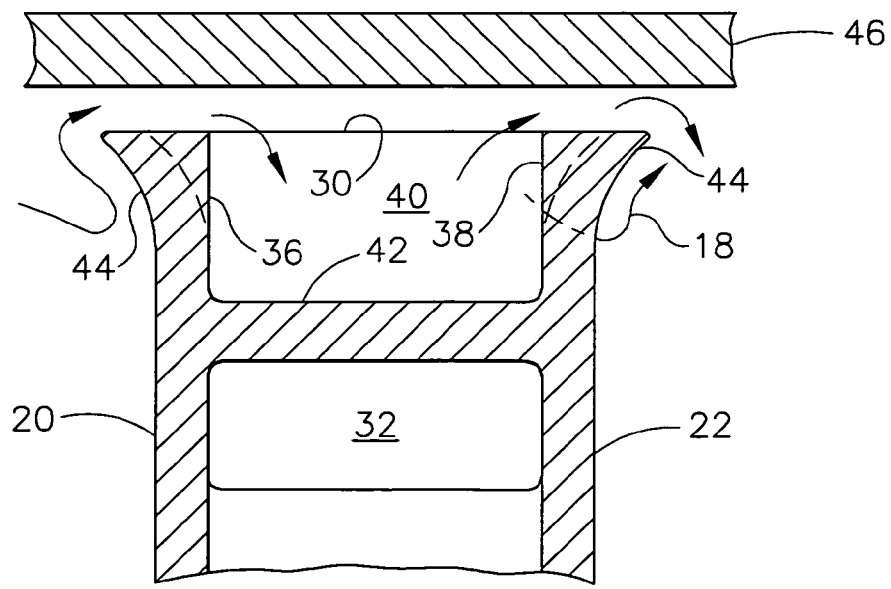
FIG. 5 is a transverse radial sectional view through an aft portion of the airfoil tip illustrated in FIG. 1 and taken along line 5-5.

FIG. 5 illustrates a transverse radial sectional view in the narrow aft portion of the airfoil which tapers in width being less than the width of the wide forward section of the airfoil illustrated in FIG. 4. The predominant leakage direction in the narrow aft region of the airfoil is over the airfoil tip from the pressure side to the suction side, with the pressure side flare 44 resisting or discouraging flow leakage over the tip gap.

However, the predominant direction of the combustion gas streamlines at the airfoil leading edge 24 illustrated in FIGS. 1-3 is normal to the leading edge, and the gases flow in parallel aft over the forward portion of the airfoil. The oppositely flared first and second ribs 36,38 illustrated in FIGS. 3 and 4 impede or resist the free flow of the combustion gases around the leading edge and into the tip gap.

FIG. 3 illustrates that the split incident flow around the airfoil tip may then flow over the opposite ribs and into the open tip cavity 40 for flow aft inside the cavity towards the trailing edge 26. The tip cavity 40 converges aft between the two ribs which guide the tip gases aft for discharge over the aft portion of the second rib 38 and corresponding suction side 22.

The flared first and second ribs 36,38 illustrated in FIGS. 4 and 5 may have suitable forms for providing flow-resisting overhangs preferentially around the airfoil tip as described above. The flares 44 preferably spread laterally outwardly from the opposite sides of the airfoil, and preferably above the tip floor 42.

Since the flares 44 introduce local interruptions in the aerodynamic contours of the opposite pressure and suction sides 20,22, their size should be as small as possible or as small as practical for resisting tip leakage without decreasing turbine efficiency attributable to the flares themselves.

The flares 44 are preferably concave outwardly from the opposite sidewalls of the airfoil and blend tangentially therewith in the radial transverse sections shown in FIGS. 4 and 5. The concave flares 44 are preferably arcuate in transverse section from the pressure and suction sides, and may be a circular arc in the form of a typical fillet, or may have compound curvature as desired, and might possibly also be straight in section.

FIGS. 3-5 illustrate that the two ribs 36,38 have substantially equal height or elevation from the common tip floor 42 and terminate radially in coplanar elevation or span around the full perimeter of the tip cavity 40. In this way, the two ribs 36,38 provide a substantially uniform radial gap with the surrounding tip shroud 46. And, the two ribs are locally flared laterally outwardly from the mouth or inlet of the tip cavity 40 on both sides of the leading edge 24 as illustrated in FIG. 1, and extend aft therefrom and terminate as above described.

The flared ribs 36,38 illustrated in FIG. 4 for example themselves terminate radially in relatively sharp corners overhanging the respective pressure and suction sides 20,22 of the airfoil tip. The flared ribs are therefore subject to heating by the combustion gases during operation and may be cooled in any conventional manner.

For example, various cooling holes (not shown) may be provided through the tip floor 42 for discharging spent cooling air from the internal cooling circuit 32 into the tip cavity 40 for cooling the inboard surfaces of the two ribs. Also, film cooling holes may be provided through the sidewalls 20,22 just below the flares for external film cooling thereof.

The inboard surfaces of the two ribs may be radially straight extensions of the inner surfaces of the two sidewalls 20,22, in which case the flares 44 add additional mass to the blade.

However, the inboard surfaces of the two ribs 36,38 may have convex flares, shown in dashed line in FIG. 4, for maintaining substantially constant the thickness of each rib 36,38 and eliminate the added weight from the flares, while correspondingly increasing the size of the tip cavity 40 as it diverges radially outwardly.

CFD analysis has been conducted for exemplary designs of the turbine blade disclosed above. The baseline blade (not shown) is without flares and has the typical rectangular cross-sectioned pressure and suction side tip ribs. The analysis indicates that the introduction of the pressure side flare 44 alone between the leading and trailing edges 24,26 can significantly improve aerodynamic efficiency of the turbine blade while also significantly reducing leakage of the combustion gases over the airfoil tip.

The analysis also predicts that the introduction of the suction side flare 44 while not necessarily further increasing efficiency of the blade can nevertheless further reduce, quite substantially, leakage of the combustion gases over the airfoil tip.

The introduction of the suction side flare 44 preferentially located as described above therefore has the ability to significantly reduce airfoil tip leakage during operation irrespective of any effect on aerodynamic efficiency, and quite significantly not adversely affecting turbine efficiency.

As indicated above, turbine efficiency, tip leakage, and tip cooling are significant design objectives in gas turbines and may be interdependent in accordance with the complex 3D flow field. Analysis confirms that the pressure and suction side flares described above perform differently on the opposite sides of the airfoil. The pressure side tip flare is effective for substantially increasing turbine efficiency while secondarily decreasing tip leakage.

In contrast, the suction side tip flare is effective for decreasing tip leakage due to its local affect on the incident combustion streamlines, with little, if any, affect on efficiency.

Accordingly, the suction side tip flare may be used independently of and without the pressure side tip flare in alternate embodiments. And, either side flare may be used with other features as desired for improving performance of HPT rotor blades.

While there have been described herein what are considered to be preferred and exemplary embodiments of the present invention, other modifications of the invention shall be apparent to those skilled in the art from the teachings herein, and it is, therefore, desired to be secured in the appended claims all such modifications as fall within the true spirit and scope of the invention.

Accordingly, what is desired to be secured by Letters Patent of the United States is the invention as defined and differentiated in the following claims in which we claim:

1. A turbine blade comprising:
   an airfoil, platform at the root thereof, and a supporting dovetail;
   said airfoil having transversely opposite pressure and suction sides extending in chord between leading and trailing edges and extending in span from said root to a tip, wherein said airfoil increases in width aft from said leading edge to a maximum width;
   said tip includes first and second ribs conforming with said pressure and suction sides, respectively, and spaced transversely apart between said leading and trailing edges to define a tip cavity having a floor enclosing said airfoil; and
   said second rib includes an outboard surface flare spreading laterally outwardly from said suction side to provide an overhang thereabove, wherein said flare extends chordally aft from said leading edge, terminating near said airfoil maximum width at said tip.

2. A blade according to claim 1 wherein said flare spreads laterally outwardly above said tip floor.

3. A blade according to claim 2 wherein said flare is concave outwardly from and blends with said suction side.

4. A blade according to claim 2 wherein said flare is arcuate in transverse section from said suction side.

5. A blade according to claim 2 wherein said first rib is flared outwardly from said pressure side around said leading edge integrally with said flared second rib thereat.

6. A blade according to claim 5 wherein said first and second ribs are coplanar around said tip cavity, and are flared laterally outwardly from the mouth of said cavity on both sides of said leading edge.

7. A blade according to claim 6 wherein:
   said first rib includes a flare blending with said pressure side near said trailing edge; and
   said second rib flare blends away into with said suction side aft of said airfoil maximum width at said tip.

8. A turbine blade including an airfoil extending in chord between opposite leading and trailing edges, said airfoil terminating in a tip having a first rib conforming with a concave pressure side and a second rib conforming with a convex external suction side and being flared laterally outwardly from said suction side to provide an overhang thereabove, wherein said flared second rib extends aft from said leading edge, and wherein said first and second ribs are transversely spaced apart between said leading and trailing edges to define a tip cavity therebetween increasing in width aft from said leading edge to a hump of maximum width, and said second rib includes a flare terminating near said hump.

9. A blade according to claim 8 wherein said flare blends with said suction side aft of said airfoil maximum width at said tip.

10. A blade according to claim 8 wherein said tip cavity includes a tip floor enclosing said airfoil below said first and second ribs, and said second rib is flared outwardly above said tip floor.

11. A blade according to claim 8 wherein said flared second rib is concave outwardly from and blends with said suction side.

12. A blade according to claim 8 wherein said flared second rib is arcuate in transverse section from said suction side.

13. A blade according to claim 8 wherein said first and second ribs are coplanar around said tip cavity, and said second rib is flared laterally outwardly from the mouth of said cavity.

\* \* \* \* \*